United States Patent
Drizard et al.

(10) Patent No.: US 11,341,027 B1
(45) Date of Patent: May 24, 2022

(54) DEFECT RESOLUTION

(71) Applicant: Palantir Technologies Inc., Palo Alto, CA (US)

(72) Inventors: Arnaud Drizard, Paris (FR); Christopher McFarland, Vienna, VA (US); Hind Kraytem, London (GB); Jean Caillé, Paris (FR); Ludovic Lay, Zürich (CH)

(73) Assignee: Palantir Technologies Inc., Palo Alto, CA (US)

( * ) Notice: Subject to any disclaimer, the term of this patent is extended or adjusted under 35 U.S.C. 154(b) by 556 days.

(21) Appl. No.: 16/250,818

(22) Filed: Jan. 17, 2019

Related U.S. Application Data

(60) Provisional application No. 62/668,672, filed on May 8, 2018.

(51) Int. Cl.
*G06F 9/44* (2018.01)
*G06F 11/36* (2006.01)
*G06F 8/70* (2018.01)
*G06F 8/10* (2018.01)

(52) U.S. Cl.
CPC ............ *G06F 11/3604* (2013.01); *G06F 8/10* (2013.01); *G06F 8/70* (2013.01); *G06F 11/3668* (2013.01)

(58) Field of Classification Search
None
See application file for complete search history.

(56) References Cited

U.S. PATENT DOCUMENTS

| | | | | |
|---|---|---|---|---|
| 8,881,095 B1* | 11/2014 | Hunt, Jr. | ............. | G06F 11/3688 717/102 |
| 2011/0067003 A1* | 3/2011 | Slothouber | ............... | G06F 8/38 717/120 |
| 2012/0167060 A1* | 6/2012 | Landwehr | ........... | G06F 11/3688 717/132 |
| 2012/0222014 A1* | 8/2012 | Peretz | ................. | G06F 11/3688 717/125 |
| 2014/0033176 A1* | 1/2014 | Rama | .................... | G06F 11/008 717/124 |

\* cited by examiner

*Primary Examiner* — Wei Y Zhen
*Assistant Examiner* — Lanny N Ung
(74) *Attorney, Agent, or Firm* — Sheppard Mullin Richter & Hampton LLP

(57) ABSTRACT

Systems, methods, and non-transitory computer readable media are provided for facilitating improved defect resolution. Defect information and defect criteria information may be obtained. The defect information may identify defects of software and/or hardware in development. The defect criteria information may define one or more criteria for measuring the defects. The defects may be measured based on the one or more criteria. A defect analysis interface may be provided. The defect analysis interface may list a limited number of the defects based on the measurements of the defects. The defect analysis interface may provide costs (e.g., computing resources, time, personnel) of solving the defects.

20 Claims, 6 Drawing Sheets

DEFECT RESOLUTION

CROSS REFERENCE TO RELATED APPLICATIONS

This application claims the benefit under 35 U.S.C. § 119(e) of U.S. Provisional Application Ser. No. 62/668,672, filed May 8, 2018, the content of which is hereby incorporated by reference in its entirety.

FIELD OF THE INVENTION

This disclosure relates to approaches for providing improved defect resolutions during development of software and/or hardware.

BACKGROUND

Under conventional approaches, defects (e.g., software bugs, hardware bugs, deviations from product specifications) arising during development of a product (e.g., a computer software application, a computer hardware component) may be recorded for resolution. However, resources (e.g., computing resources, time, personnel) available to resolve defects may be limited, and dealing with all recorded defects may not be feasible.

SUMMARY

Various embodiments of the present disclosure may include systems, methods, and non-transitory computer readable media configured to provide improved defect resolution. Defect information may be obtained. The defect information may identify defects of an executable application in development. Defect criteria information may be obtained. The defect criteria information may define one or more criteria for measuring the defects. The defects may be measured based on the one or more criteria. A defect analysis interface may be provided. The defect analysis interface may list a limited number of the defects based on the measurements of the defects.

In some embodiments, the defect information may further identify defects of hardware in development.

In some embodiments, the one or more criteria may include a ranking criterion for ranking the defects and the limited number of the defects may be listed on the defect analysis interface based on the ranking of the defects. The ranking criterion may be determined based on inspection information. The inspection information may characterize prior inspection of the executable application in development or a similar executable application.

In some embodiments, the executable application may be developed in accordance with a development process. The development process may include multiple stages. The one or more criteria may include a pass criterion for determining whether the executable application passes a given stage of the multiple stages. The pass criterion may include a pass threshold, which may be defined in terms of a number of defects or a rate of defects.

In some embodiments, the defect analysis interface may include information relating to the listed defects. The information relating to the listed defects may include descriptions of the listed defects, properties of the listed defects, or media of the listed defects.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
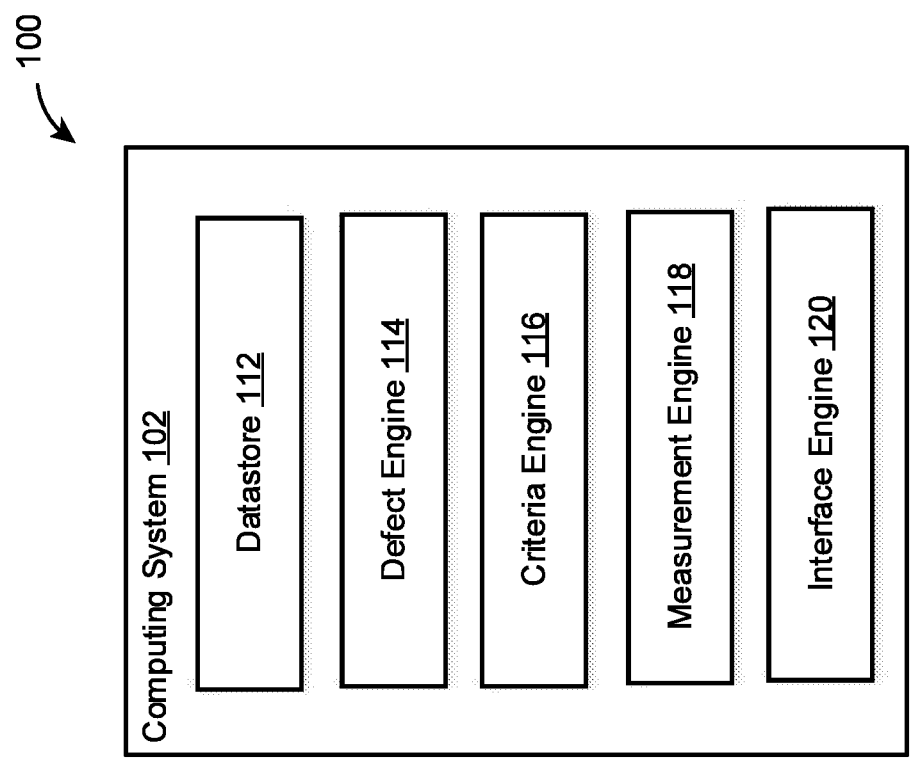
FIG. 1 illustrates an example environment for providing improved defect resolution, in accordance with various embodiments.

A claimed solution rooted in computer technology overcomes problems specifically arising in the realm of computer technology. In various implementations, a computing system is configured to obtain defect information and defect criteria information. The defect information may identify defects of an executable application in development. The defect information may identify defects of other software and/or hardware in development. The defect criteria information may define one or more criteria for measuring the defects. Criteria for measuring defects may be static or dynamic. The defects may be measured based on the one or more criteria. A defect analysis interface may be provided. The defect analysis interface may list a limited number of the defects based on the measurements of the defects. The defect analysis interface may provide costs (e.g., computing resources, time, personnel) of solving the defects.

In some embodiments, one or more criteria for measuring the defects may include a ranking criterion for ranking the defects. The limited number of the defects may be listed on the defect analysis interface based on the ranking of the defects. For example, the ranking criterion may include information for weighing and/or scoring the defects. For instance, the ranking criterion may be used to weigh or score the defects based on costs of solving the defects. In some embodiments, the ranking criterion may be determined based on inspection information. The inspection information may characterize prior inspection of the executable application in development or a similar executable application. For instance, the inspection information may characterize a prior inspection of same type of software/hardware by a user (e.g., developer, customer), such as how much time was spent on different features/defects of the software/hardware, and the inspection information may be used to weigh/score the defects based on level of importance to the user.

In some embodiments, the executable application may be developed in accordance with a development process including multiple stages. One or more criteria for measuring the defects may include a pass criterion for determining whether the executable application passes a given stage of the multiple stages. For example, the pass criterion may include a pass threshold, where the pass threshold is defined in terms of a number of defects or a rate of defects of the executable application at a given stage.

In some embodiments, the defect analysis interface may include information relating to the listed defects. The information relating to the listed defects may include descriptions of the listed defects, properties of the listed defect, or media (e.g., images, audios, videos) of the listed defects. The defect analysis interface may provide visualizations of the listed defects using charts, graphs, and/or other visual information. The defect analysis interface may provide analysis of the listed defects, such as information relating to severity, efficiency, criticality, and/or trend of the listed defects.

The approaches disclosed herein may facilitate improved resolution of defects in a product, such as software/hardware in development. Displaying the limited number of defects based on measurements of the defects may allow a user to selectively identify defects for resolution. Displaying the costs of solving different defects may facilitate a user's development of a plan to investigate and/or resolve the defects given a limited amount of resources (e.g., computing resources, time, personnel).

FIG. 1 illustrates an example environment 100 for providing improved defect resolution, in accordance with various embodiments. The example environment 100 may include a computing system 102. The computing system 102 may include one or more processors and memory. The processor(s) may be configured to perform various operations by interpreting machine-readable instructions stored in the memory. The computing system 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a data engine 114, a criteria engine 116, a measurement engine 118, an interface engine 120, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the defect engine 114 may be configured to obtain defect information. Obtaining defect information may include accessing, acquiring, analyzing, determining, examining, identifying, loading, locating, opening, receiving, retrieving, reviewing, storing, and/or otherwise obtaining the defect information. For example, the defect engine 114 may search for and/or retrieve defect information for one or more particular products or one or more particular portions, features, and/or aspects of products. Defect information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Defect information may be obtained from one or more databases (e.g., stored within the datastore 112). Defect information may be stored within a single file or across multiple files. For example, defect information for a product may have been ingested into a database as one or more objects, and the defect engine 114 may retrieve the object(s) to obtain the defect information.

Defect information may identify defects of a product. A product may refer to an article or a substance that is produced, such as software (e.g., an executable application, module, library, etc.) and/or hardware (e.g., tool, machine, etc.). The product may be undergoing development, may be being manufactured, and/or may be otherwise being produced. For example, defect information may identify defects of a software or hardware in development. A defect may refer to a fault, a shortcoming, or a problem in the product. For example, a defect may include software bugs, faulty software design, faulty codes in software, hardware bugs, faulty hardware design, faulty hardware components/materials, deviations from product specifications, standards, expectations, and/or requirements, and/or other defect.

Defects in a product may be recorded based on physical observations of the product, analysis of the product, and/or other information. For example, defects in software/hardware may be observed by entities (persons, organizations) working on the software/hardware during and/or after a development stage and may be recorded. Defects in software/hardware may be identified and/or predicted using testing tools (e.g., software compiler, evaluation tool, detector). Other recordation of defects in a product are contemplated.

In various embodiments, the criteria engine 116 may be configured to obtain defect criteria information. Obtaining defect criteria information may include accessing, acquiring, analyzing, determining, examining, identifying, loading, locating, opening, receiving, retrieving, reviewing, storing, and/or otherwise obtaining the defect criteria information. For example, the criteria engine 116 may search for and/or retrieve defect criteria information for one or more particular products or one or more particular portions, features, and/or aspects of products. Defect criteria information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102

(e.g., electronic storage accessible to the computing system 102 through a network). Defect criteria information may be obtained from one or more databases (e.g., stored within the datastore 112). Defect criteria information may be stored within a single file or across multiple files. For example, defect criteria information for a product may have been ingested into a database as one or more objects, and the criteria engine 116 may retrieve the object(s) to obtain the defect criteria information.

Defect criteria information may define one or more criteria for measuring defects of a product. For instance, defect criteria information may define one or more criteria for measuring defects of software and/or hardware in development. A criterion for measuring defects of a products may refer to one or more of standards, factors, and/or rules by which defects of a product are measured. For example, a criterion for measuring defects of a product may include a criterion by which the defects are weighed for resolution. For instance, a criterion for measuring defects of a product in development may define how the defects are to be measured in terms of costs (e.g., computing resources, time, personnel) of inspecting and/or correcting the defect, and/or in terms of importance to the development of the product, (e.g., passing a stage of development, reducing defects in later stages of the development, passing an inspection of the product). A criterion for measuring defects of a product may be static or dynamic. That is, a criterion for measuring defects of a product may remain the same regardless of variables relating to the product (e.g., time of development/manufacture, entity for which the product is being developed/manufactured, entities involved in the product development/manufacture, entities involved in quality control of the product, etc.) or a criterion for measuring defects of a product may change based on one or more variables relating to the product. For instance, based on which entity may be responsible for inspect a product for quality control, one or more criteria for measuring defects in the product may be adjusted based on how the entity inspects the product and/or which portions, features, and/or aspects of the product are given priority/considered more important by the entity.

In some embodiments, one or more criteria obtained by the criteria engine 116 may include a ranking criterion for ranking the defects. A ranking criterion may include one or more of standards, factors, and/or rules by which defects of a product are ranked. For example, a ranking criterion may include information for weighing and/or scoring the defects. Such weights/scores of defects may provide indications of which defects should be targeted for resolution. For instance, weights/scores of defect may enable ordering of defects based on the weights/scores, where the defects ordered at the top/bottom may be given higher priority for resolution than other defects. For example, a ranking criterion may be used to weigh or score the defects based on costs of solving the defects. The costs of solving the defects may include amount of one or more resources that are expected/required to be expended to resolve (e.g., inspect, correct) the defect. For example, the costs of solving defects of software/hardware in development may include expected/required expenditure of computing resources, time, and/or personnel. The defects may be weighed/scored according to the costs associated with resolving the defect and the defects may be prioritized for resolution based on the costs. Other types of costs of solving defects and ranking/weighing of defects are contemplated.

In some embodiments, a ranking criterion may be determined based on inspection information. Inspection information may refer to information relating to and/or that characterizes prior inspection of the same product/product portion/product feature/product aspect, the same type of product/product portion/product feature/product aspect, and/or a similar product/product portion/product feature/product aspect. For example, a ranking criterion for software/hardware in development may be determined based on information relating to prior inspection of the same or similar software/hardware, the same or similar software/hardware portion, the same or similar software/hardware feature, the same or similar software/hardware aspect, the same type of software/hardware, the same type of software/hardware portion, the same type of software/hardware feature, and/or the same type of software/hardware aspect. For instance, inspection information may characterize a prior inspection of the same type of software/hardware by an entity (e.g., person(s), organization(s), developer(s), customer(s)), such as how much time was spent on different portions/features/aspects/defects of the software/hardware, and the inspection information may be used to weigh/score the defects based on level of importance to the user. That is, the portions/features/aspects/defects of the software/hardware that were focused on by the entity may be weighed more than other portions/features/aspects/defects of the software/hardware. Use of such criteria may enable the computing system 102 to facilitate resolution of defects that are of most importance to the entity.

In some embodiments, a product (e.g., software/hardware) may be developed in accordance with a development process. A development process may split development of the product into multiple stages. For example, software may be development in accordance with a software development process that divides the development work into multiple stages to improve software design, software management, and/or development management. One or more criteria obtained by the criteria engine 116 may include a pass criterion for determining whether the product passes the development process/stages of the development process. A pass criterion may include one or more of standards, factors, and/or rules by which defects are measured to determine whether the product passes one or more stages of the development process. For example, a pass criterion may include a pass threshold which must be met by the product in order for the product to pass a certain stage of the development process. The pass threshold may be defined in terms of a number of defects or a rate of defects of the product at a given stage. For example, for a stage of software development, a pass criterion may include a pass threshold that requires the software to have no more than a certain number of defects at the given stage. A passing criterion may provide for analysis of combinations of different types of defects. For instance, a passing criterion may allow for a greater number of minor defects than major defects for the software to pass a given stage. A passing criterion may provide for analysis of different stages of the development process. For instance, a passing criterion may include a review of changes in defects of a software as the software progresses through different stages of the development process. For example, a passing criterion may provide for a pattern of defects (e.g., number and/or severity of defects) that may be allowed as the software moves along the development process. For instance, a passing criterion may allow a hardware to include certain types/numbers of defects in a preliminary stage while not allowing those defects (or allowing fewer types/numbers of defects) in a later stage in the development process.

In various embodiments, the measurement engine 118 may be configured to measure one or more defects based on one or more criteria. The measurement engine 118 may measure defects identified by defect information (obtained by the defect engine 114) based on one or more criteria defined by defect criteria information (obtained by the criteria engine 116). Measuring a defect based on a criterion may include ascertain the quality and/or quantity of the defect based on the criterion. For example, the measurement engine 118 may measure defects of a product based on one or more criteria to weigh/score the defect for resolution. For instance, a defect of a product in development may be measured in terms of costs of (e.g., computing resources, time, personnel) of inspecting and/or correcting the defect, and/or in terms of importance to the development of the product, (e.g., passing a stage of development, reducing defects in later stages of the development, passing an inspection of the product). The measurement engine 118 may measure defects of a product based on one or more criteria to rank the defects for resolution (e.g., ranking based on weights/scores). The measurement engine 118 may measure defects of a product based on one or more criteria to determine whether the produce passes one or more stages of a development process.

The measurement of defects by the measurement engine 118 may depend on variables relating to the product. For example, the measurement of defects of a product in development may change based on entity for which the product is being developed. The defects of a product may be measured based on one or more criteria that takes info account the entity's treatment of defects (e.g., determined based on inspection information) to measure/weigh/score/rank the defects according to how the entity prioritizes the defects. Such measurements of defects may enable a user to develop a resolution plan that tailors the approaches for resolving defects according to the entity for which the product is being produced (e.g., developed, manufactured).

In various embodiments, the interface engine 120 may be configured to provide one or more interfaces through which information relating to the measured defects are accessible. Information relating to the measured defects may include information relating to the defects (e.g., documentation of the defects, properties of the defects, media of the defects), information relating to measurements of the defects (costs of resolving the defects, ranking/ordering of defects), and/or other information. For example, the interface(s) provided by the interface engine 120 may enable access of descriptions of defects, properties of defects, media (e.g., images, audios, videos) of defects, and/or other information.

The interface(s) provided by the interface engine 120 may include application programming interface(s) and/or user interface(s) through which information relating to the measured defects are accessible. For example, the interface engine 120 may provide one or more APIs that may be used by users/computing devices to view, use, and/or manipulate information relating to the measured defects. As another example, the interface engine 120 may provide one or more user interfaces (e.g., web user interface) through which users/computing devices may enter/select/provide commands to view, use, and/or manipulate information relating to the measured defects. For example, the interface engine 120 may provide a defect analysis interface and/or other interfaces. The defect analysis interface may list a limited number of defects based on the measurements of the defects. For instance, the defect analysis interface may list a limited number of defects based on weights, scores, ranking of defects, and/or costs of resolving the defects. A product may include numerous defects and providing a list of a limited number of defects based on measurements, such as providing a list of easily resolved but customer-important defects, a list that group defects based on commonalities and measurements, and/or a list of approaches for resolving certain defects may facilitate more efficient resolution of defect by helping to maximize the return on expending the limited resources available for resolving defects. The defect analysis interface may list a limited number of defects based on measurement of defects (e.g., quantity, quality) at different stages of development process and may facilitate identification and resolution of particular defects to enable the product to pass one or more stages of the development process. The defect analysis interface may provide visualizations of the listed defects using charts, graphs, and/or other visual information. The defect analysis interface may provide analysis of the listed defects, such as information relating to severity, efficiency, criticality, and/or trend of the listed defects. The defect analysis interface may flag one or more defects for review and/or further analysis/attention. Such flagging of defects may be performed based on the quality and/or quantity of the defect. For example, a critical defect may be flagged, a defect of a product feature important to a customer may be flagged, a defect that appears in many portions/features/aspects of a product may be flagged, and/or other defects may be flagged based on the quality and/or the quantity of the defects.

Information accessible through the interface(s) may facilitate resolution of the defects by helping to locate root causes of the defects, develop approaches for resolving a limited number of defects, allow different entities (e.g., different persons, different teams) to coordinate work on products, and/or otherwise selectively identify defects for resolution given a limited amount of resources. Information accessible through the interface(s) may improve quality of the product and may be used to anticipate user satisfaction/rate of acceptance of the product. For example, the interface(s) may allow access of information on defects that are prioritized based on prior inspection of the same or similar product by the entity (e.g., customer) for which the product is intended. Such information may be used to prioritize the limited resources available to resolve defects of the product on defects that would likely be of greater concern to the intended entity.

Figure 2:
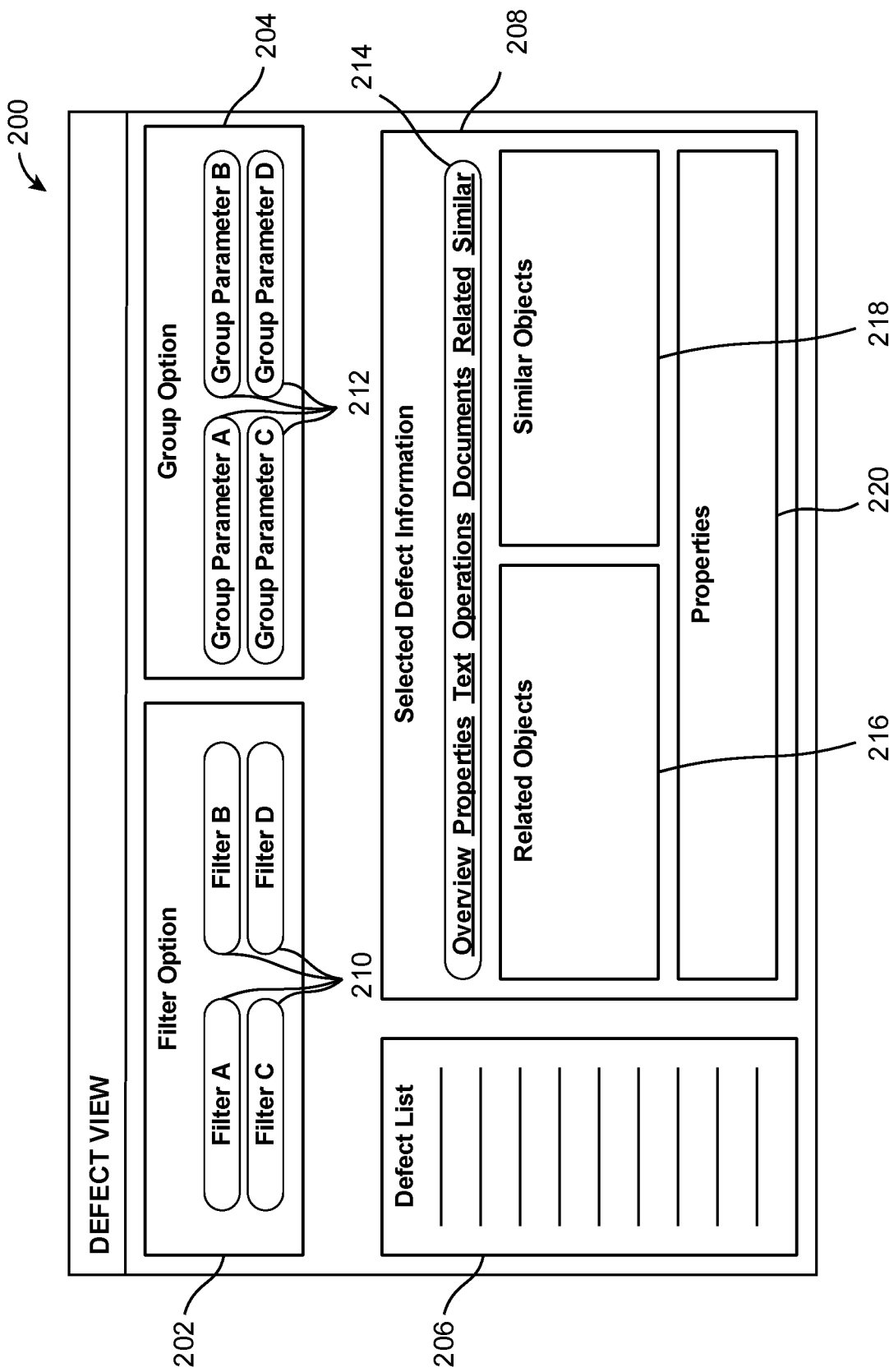
FIG. 2 illustrates an example user interface for providing improved defect resolution, in accordance with various embodiments.
Figure 3:
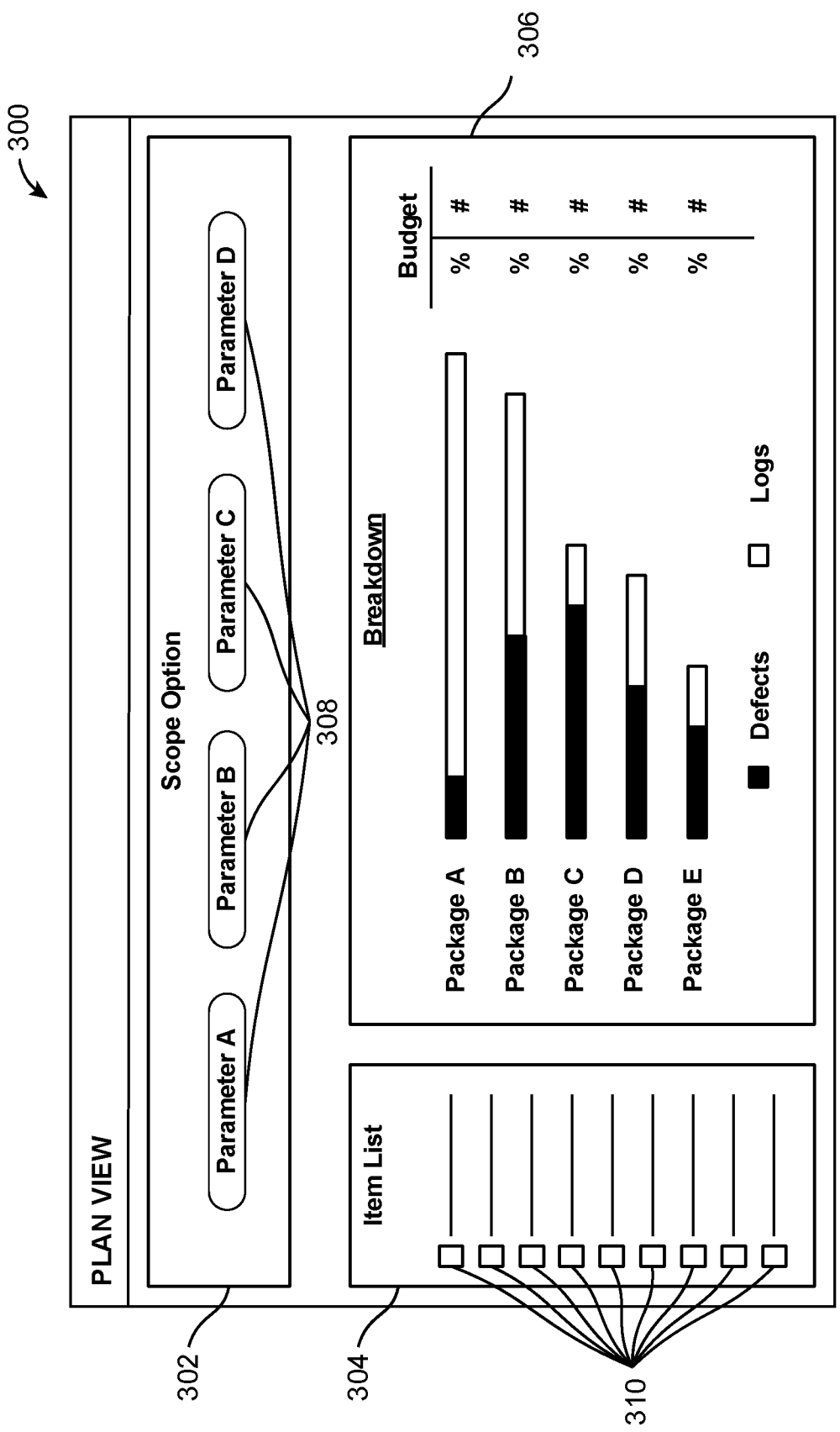
FIG. 3 illustrates an example user interface for providing improved defect resolution, in accordance with various embodiments.
Figure 4:
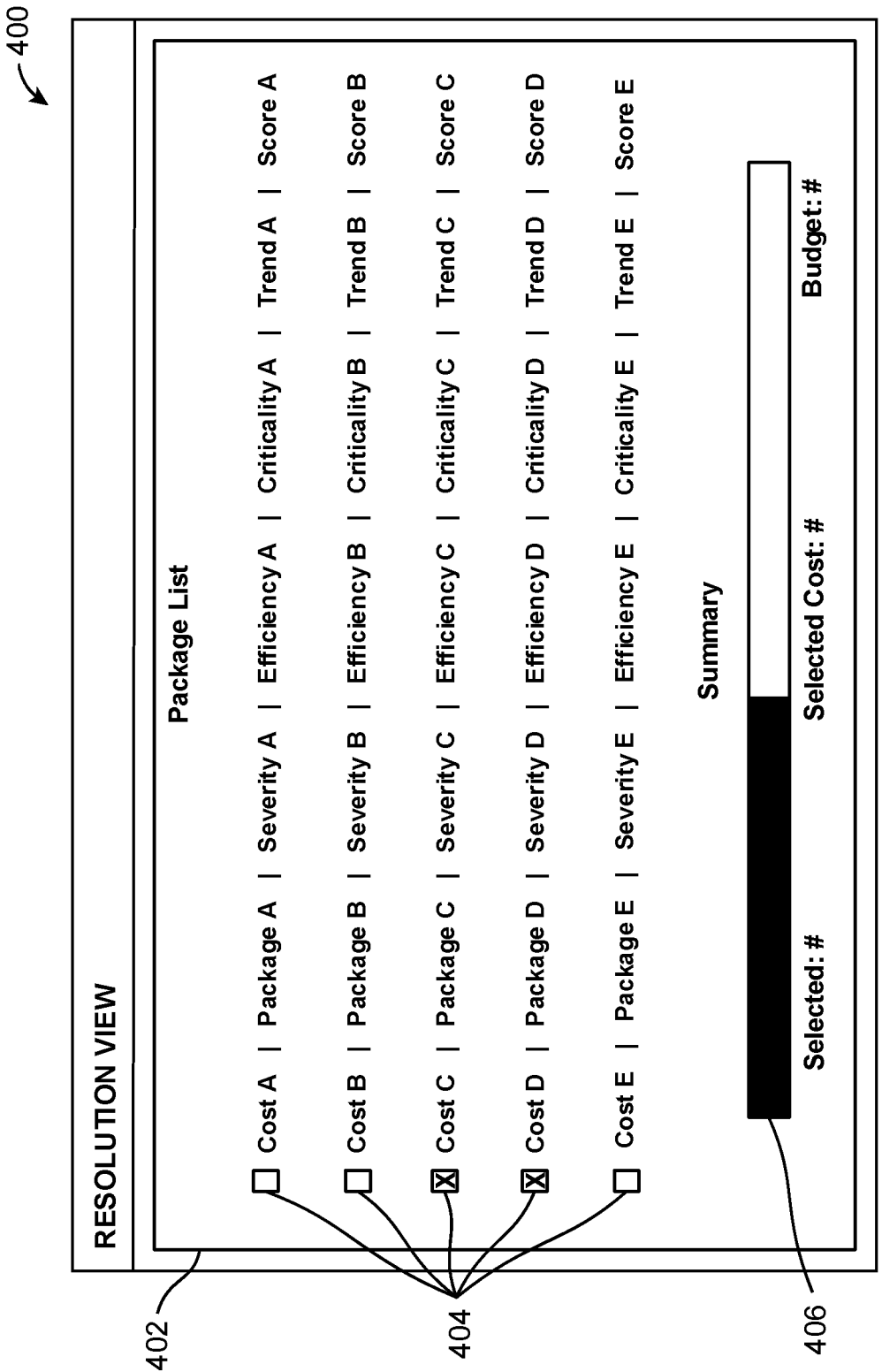
FIG. 4 illustrates example user interface for providing improved defect resolution, in accordance with various embodiments.

FIGS. 2-4 illustrate example user interfaces 200, 300, 400 for providing improved defect resolution, in accordance with various embodiments. In various embodiments, the user interfaces 200, 300, 400 may be accessed through a software application running on a computing device (e.g., computers, mobile phones, tablets, etc.) that includes one or more processors and memory. For example, the user interfaces 200, 300, 400 may be accessible through a web browser. In another example, the user interfaces 200, 300, 400 may be provided through a data analysis application. In yet another example, the user interfaces 200, 300, 400 may be provided as a service over a network (e.g., software as a service). Other uses of the user interfaces 200, 300, 400 are contemplated. Depending on the computing device, the user may be able to interact with the user interfaces 200, 300, 400 using various input devices (e.g., keyboard, mouse, etc.) and/or touch gestures. The user interfaces 200, 300, 400 are provided merely as examples and, naturally, the arrangement and configuration of such user interfaces can vary depending on the implementation. Thus, depending on the implementation, the user interfaces 200, 300, 400 may include additional features and/or alternative features.

Referring to FIG. 2, the user interface 200 may include an example defect view for improved defect resolution. The user interface 200 may include a filter option section 202, a group option section 204, a defect list section 206, and selected defect information section 208. The filter option section 202 may include options 210. A user may select one or more of the options 210 to filter the defects to be listed within one or more interfaces and/or one or more portions of user interfaces. For example, a user may select one or more filters/options for one or more filters (e.g., filters A, B, C, D) using the options 210 to determine which defects will be listed within the user interface 200, within the defect list 206, within another portion of the user interface 200, and/or within another user interface. For instance, the options 210 may enable a user to filter the defects based on one or more properties of the defects, such as type of defect, location of defect, root cause of defect, affected portion of the product, entities involved in the defects (e.g., persons that discovered/recorded the defect, persons that may be assigned to resolve the defect, persons that will inspect the product for the defect). Other filtering of defects are contemplated.

The group option section 204 may include options 212. A user may select one or more of the options 212 to group defects into one or more groups. For example, a user may select one or more groupings/options for one or more groupings (e.g., group parameters A, B, C, D) using the options 212 to determine how and/or which defects may be grouped together. A user to select one or more of the options 212 to determine how defects (which may have been filtered based on the selection of options 210 in the filter option section 202) may be grouped. A user to select one or more of the options 212 to determine how properties defects may be grouped. That is, one or more properties of the defects may be merged for display and/or analysis. Thus, the options 212 may enable a user to determine how the defects may be grouped together for display, analysis, and/or resolution. For instance, the options 212 may enable a user to group the defects/properties of the defects based on one or more properties of the defects, such as type of defect, location of defect, root cause of defect, affected portion of the product, entities involved in the defects (e.g., persons that discovered/recorded the defect, persons that may be assigned to resolve the defect, persons that will inspect the product for the defect). Other grouping of defects are contemplated.

The defect list section 206 may provide one or more listings of defects. The listing(s) of defects within the defect list section 206 may enable a user to select one or more defects for further review. For example, a listing of defects within the defect list section 206 may include individual defects/groupings of defects which may be selected by a user. The defects may be listed in the defect list section 206 based on a particular ordering, such as based on alphabetical ordering, numerical ordering, ordering based on measurements of defects, such as costs of resolving the defects, and/or other ordering. The defect list section 206 may provide a list of a limited number of defects based on the measurements of the defects. The selection of a defect within the defect list section 206 may prompt the user interface 200 to provide information about the selected defect within the selected defect information section 208.

The selected defect information section 208 may include a view option portion 214, a related objects portion 216, a similar objects portion 218, and a properties portion 220. The view option portion 214 may include options (e.g., links, shortcuts, buttons) that enable a user to select what type of information is presented within the selected defect information section 208. For example, the view option portion 214 may include options for a user to see overview, properties, text, operations, documents (e.g., logs, images, audios, videos), related defects/objects, similar defects/objects of a selected defects. For instance, the selected defect information section 208 as shown in FIG. 2 may include a view of an overview of a selected defect. The overview of the selected defect may include summary views of different information relating to the selected defect, such as a summary view of related objects 216, a summary view of similar objects 218, and a summary view of properties 220. The overview of the selected defect may include summary views of other information, which may be accessible via scrolling operation (e.g., scrolling down the selected defect information section 208 to see summary of other information).

The user interface 200 may facilitate analysis of defects for resolution. A user may interact with the user interface 200 to see information on different defects of a product and/or to see different types of information on the defects (e.g., properties of the defect, related/similar defects, media of defects) to obtain a better understanding of the defect. A user may utilize the information provided by the user interface 200 to see information that has been collected relating a defect, see context of the defect, see the entities involved in the defect, and/or other information relating to the defects. A user may use the information provided by the user interface 200 to determine changes in how the defects are filtered (e.g., via the options 210, how the defects are grouped (e.g., via the options 212), and/or to determine a plan for investigating and/or correcting the defects.

Referring to FIG. 3, the user interface 300 may include an example plan view for improved defect resolution. The user interface 300 may include a scope option section 302, an item list section 304, and a breakdown section 306. The scope option section 302 may include options 308. A user may select one or more of the options 308 to determine the scope of a plan for resolving defects. A plan for resolving defect may include one or more approaches for inspecting and/or correcting the defects. The scope of a plan for resolving defects may refer to the extent of the defects/product that will be addressed by the plan for resolving defects. For example, a user may select one or more of scope options/options for scope (e.g., parameters A, B, C, D) using the options 308 to determine the scope of a plan for resolving defects. For instance, the options 308 may enable a user to set the products and/or defects to be addressed by the plan. The options 308 may enable a user to determine one or more variables for the plan, such as setting resources available to resolve the defects (e.g., actual budget) and/or setting amount of resources desired to be expended to resolve the defects (e.g., desired budget).

The item list section 304 may provide one or more listings of items. An item may refer to an individual articular and/or unit that may include defects. For example, an item may include a product, a portion of a product, a feature of a product, and/or an aspect of a product. For instance, the items listed in the item list section may include different copies of the product (e.g., associated with different identifiers), different portions of a product, different features of a product, or different aspects of a product. Items may be listed in the item list section 304 based on a particular ordering, such as based on alphabetical ordering, numerical ordering, ordering based on measurements of defects of the items, such as costs of resolving the defects, and/or other ordering. The item list section 304 may provide a list of a limited number of items based on the measurements of the defects of the items.

The listing(s) of items within the item list section 304 may enable a user to select one or more items for review and/or analysis. For example, the item list section 304 may include options 310. The options 310 may correspond to individual items listed in the item list section 304. Selection of the options 310 may prompt the user interface 300 to provide information about the selected item within the breakdown section 306 and/or to analyze the selected item for provision of information within the breakdown section 306. For instance, a user may use the options 310 to select which items will and will not be included within the information provided within the breakdown section 306.

The breakdown section 306 may provide information relating to defects of a product. The breakdown section 306 may provide information relating to defects based on grouping of defects, such as grouping of defects into packages. A package may include a single defect or multiple defects. For instance, a package may include multiple defects based on sharing of one or more common traits (e.g., based on commonality of defect properties, such as type of defect, location of defect, root cause of defect, affected portion of the product, entities involved in the defects). A package may be directed to a particular approach for resolving a set of defects. For example, a package may be directed to a particular approach for inspecting a set of defects and/or to a particular approach for correcting a set of defects. Packages may be listed in the breakdown section 306 based on a particular ordering, such as based on alphabetical ordering, numerical ordering, ordering based on measurements of defects within the packages, and/or other ordering.

The breakdown section 306 may provide visual representation of the packages, such as charts, graphs, and/or other visual information. For instance, the breakdown section 306 as shown in FIG. 3 may include a bar chart providing visual representation of a number of defects in different packages and a number of logs associated with the defects/packages. For example, for package A, the breakdown section 306 may provide a visual representation of how many defects are included within the package A and how many logs (e.g., defect recordation logs) are associated with these defects/package A.

The breakdown section 306 may provide information relating to costs of resolving defects within different packages. For example, a user may have set a certain budget in terms of time to resolve defects in a product. For instance, a user may have set the actual amount of time available or the desired amount of time to resolve defects in the product. The breakdown section 306 may provide one or more measurements of how much of the budget is expected and/or should be taken to address the defects in various packages. For example, the breakdown section 306 may provide, for individual packages, the percentage of the actual/desired budget that is expected/should be used to resolve the defects in various packages. The breakdown section 306 may provide, for individual packages, the amount of time that is expected/should be used to resolve the defects in various packages. Such information may provide visibility into costs of resolving different defects and allow a user to determine which defects may be addressed and/or which approaches to resolve defects should be pursued within the allotted budget. Based on the information provided within the breakdown section 306, a user may add or remove items from the breakdown section 306 by using the options 310.

Referring to FIG. 4, the user interface 400 may include an example resolution view for improved defect resolution. The user interface 400 may include a plan section 402. The plan section 402 may provide information relating to different packages for resolving defects. Packages may be listed in the plan section 402 based on a particular ordering, such as based on alphabetical ordering, numerical ordering, ordering based on measurements of defects within the packages, and/or other ordering. The plan section 402 may provide different information relating to various packages.

For instance, the plan section 402 as shown in FIG. 4 may include information relating to cost, identity, severity, efficiency, criticality, trend, and score of different packages. A cost of a package may refer to an amount of one or more resources that are expected/required to be expended to resolve (e.g., inspect, correct) the defects in the package. A severity of a package may refer to a quantity and/or quality of defects in the package. An efficiency of a package may refer to a measure of effect of addressing the defects in the package, such as whether resolving particular defects in the package may result in reduction of other defects. A criticality of a package may refer to the type of defects in the package, such as whether they are defects to functions of a product or arising from/causing damage to the product. A trend of a package may refer to an indication of whether the defects in the package are new types of defects (for the product, for a portion/feature/aspect of the product) and/or previously seen defects (for the product, for a portion/feature/aspect of the product). The trend of defects/packages may be dependent on how an entity for which the product is intended perceives defects in the product. For example, the trend may provide an indication of whether a particular entity (e.g., particular inspector) repeatedly flagged certain defects while ignoring other defects. Such information may be used to visualize which type of defects are of concern to the entity. A score may refer to a measure of the defects in the packages. The defects may be measured based on one or more criteria.

The plan section 402 may enable a user to select which packages may be included within a plan for resolving defects of a product. For example, the plan section 402 may include options 404. The options 404 may correspond to individual packages listed in the plan section 402. A user may select which of the packages (e.g., packages C, D) will be included within the plan for resolving defects by interacting with the options 404. That is, a user may use the options 404 to select which packages will and will not be included within the plan for resolving defects. The plan section 402 may provide a summary of the plan based on the user's selection of packages. For example, the plan section 402 may provide a visual representation 406 of how much resources are expected to be expended to resolve the defects in the selected packages compared to the available resources. For example, the bar in the visual representation 406 may indicate how much of a budget for resolving defects is expected to be required to resolve defects in packages C and D. The visual representation 406 may include other visual representation of the amount of resources expected to be expended, such as a numerical (e.g., percentage) representation or color representation (e.g., green bar for majority of the budget remaining, orange bar for minority of the budget remaining, red bar for budget being reached/exceeded). The plan section 402 may provide other information relating to the plan for resolving defects, such as the number of packages selected for inclusion in the plan, the amount of cost expected to take to resolve defects in the selected packages, and the amount of budget. The plan section 402 may provide a breakdown of the selected packages and may enable a user to export information relating to the selected packages and/or export the plan that includes the selected packages.

Figure 5:
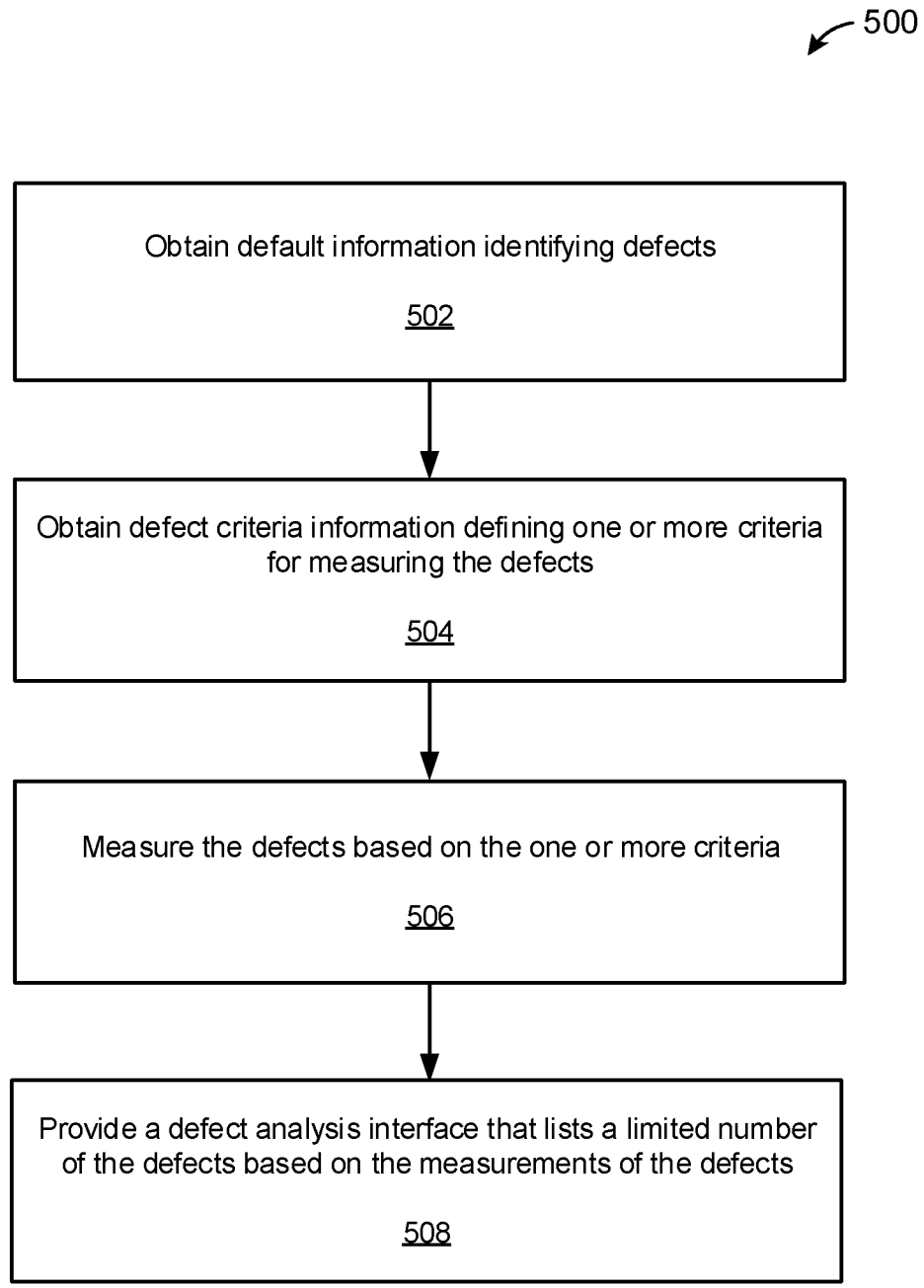
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, defect information may be obtained. The defect information may identify defects (e.g., of an executable application in development). At block 504, defect criteria information may be obtained. The defect criteria information may define one or more criteria for measuring the defects. At block 506, the defects may be measured based on the one or more criteria. At block 508, a defect analysis interface may be provided. The defect analysis interface may list a limited number of the defects based on the measurements of the defects Hardware Implementation The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
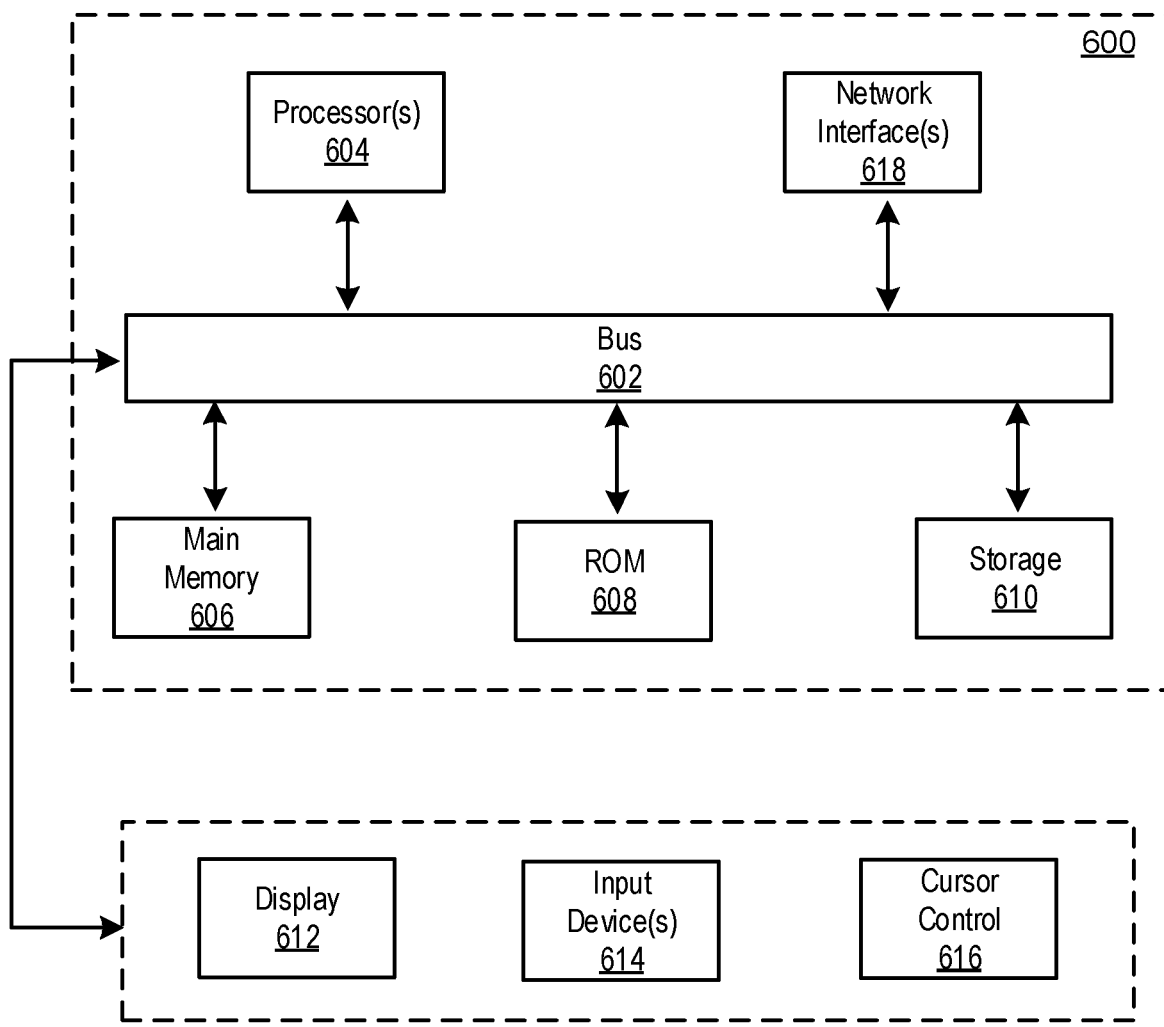
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A system comprising:
one or more processors; and
a memory storing instructions that, when executed by the one or more processors, cause the system to perform:
identifying changes in defects of a product;
recording the changes in the defects within a file in a database;
retrieving, from the database, defect criteria information, the defect criteria information defining one or more criteria for analyzing the defects;
analyzing the defects based on the defect criteria information;
providing a defect analysis interface, the defect analysis interface displaying a subset of the defects based on the analysis of the defects and prospective parameters associated with a resolution of the subset of the defects;

receiving an input regarding a subset of the prospective parameters;

determining resources to resolve the subset of the defects based at least in part on the input and the analysis of the defects;

prioritizing the resolution of the subset of the defects based on the determined resources; and electronically exporting the resolution of the subset of the defects and the determined resources to a different computing system to resolve the subset of the defects.

2. The system of claim 1, wherein the product comprises a hardware component.

3. The system of claim 2, wherein the defect criteria information comprises a ranking criterion for ranking the defects and the subset of the defects is listed on the defect analysis interface based on the ranking of the defects.

4. The system of claim 3, wherein the ranking criterion is determined based on inspection information, the inspection information characterizing prior inspection of the product or a similar product.

5. The system of claim 1, wherein the product is developed in accordance with a development process including multiple stages, and the defect criteria information comprises a pass criterion for determining whether the product passes a given stage of the multiple stages.

6. The system of claim 1, wherein the defect analysis interface includes information relating to the subset, the information relating to the subset including descriptions of the subset, properties of the subset, or media of the subset.

7. A method implemented by a computing system including one or more processors and storage media storing machine-readable instructions, wherein the method is performed using the one or more processors, the method comprising:

identifying changes in defects of a product;

recording the changes in the defects within a file in a database;

retrieving, from the database, defect criteria information, the defect criteria information defining one or more criteria for analyzing the defects;

analyzing the defects based on the defect criteria information;

providing a defect analysis interface, the defect analysis interface displaying a subset of the defects based on the analysis of the defects and prospective parameters associated with a resolution of the subset of the defects;

receiving an input regarding a subset of the prospective parameters;

determining resources to resolve the subset of the defects based at least in part on the input and the analysis of the defects;

prioritizing the resolution of the subset of the defects based on the determined resources; and electronically exporting the resolution of the subset of the defects and the determined resources to a different computing system to resolve the subset of the defects.

8. The method of claim 7, wherein the product comprises a hardware component.

9. The method of claim 8, wherein the defect criteria information comprises a ranking criterion for ranking the defects and the subset of the defects is listed on the defect analysis interface based on the ranking of the defects.

10. The method of claim 9, wherein the ranking criterion is determined based on inspection information, the inspection information characterizing prior inspection of the product or a similar product.

11. The method of claim 7, wherein the product is developed in accordance with a development process including multiple stages, and the defect criteria information comprises a pass criterion for determining whether the product passes a given stage of the multiple stages.

12. The method of claim 7, wherein the defect analysis interface includes information relating to the subset, the information relating to the subset including descriptions of the subset, properties of the subset, or media of the subset.

13. A non-transitory computer readable medium comprising instructions that, when executed, cause one or more processors to perform:

identifying changes in defects of a product;

recording the changes in the defects within a file in a database;

retrieving, from the database, defect criteria information, the defect criteria information defining one or more criteria for analyzing the defects;

analyzing the defects based on the defect criteria information;

providing a defect analysis interface, the defect analysis interface displaying a subset of the defects based on the analysis of the defects and prospective parameters associated with a resolution of the subset of the defects;

receiving an input regarding a subset of the prospective parameters;

determining resources to resolve the subset of the defects based at least in part on the input and the analysis of the defects;

prioritizing the resolution of the subset of the defects based on the determined resources; and electronically exporting the resolution of the subset of the defects and the determined resources to a different computing system to resolve the subset of the defects.

14. The non-transitory computer readable medium of claim 13, wherein the product comprises a hardware component.

15. The non-transitory computer readable medium of claim 14, wherein the defect criteria information comprises a ranking criterion for ranking the defects and the subset of the defects is listed on the defect analysis interface based on the ranking of the defects.

16. The non-transitory computer readable medium of claim 15, wherein the ranking criterion is determined based on inspection information, the inspection information characterizing prior inspection of the product or a similar product.

17. The non-transitory computer readable medium of claim 13, wherein the product is developed in accordance with a development process including multiple stages, and the defect criteria information comprises a pass criterion for determining whether the product passes a given stage of the multiple stages.

18. The system of claim 1, wherein the recording comprises recording an image, audio, or video of the changes in the defects.

19. The system of claim 1, wherein the providing of the defect analysis interface comprises populating:

a list of the defects in a bottom left portion of the defect analysis interface;

data associated with the defects at a bottom right portion of the defect analysis interface, the data comprising images, audios or videos of the defects, properties of the defects, and operations previously performed on the defects;

a selection of a filter criteria with which to arrange the defects in the list at an upper left portion of the defect analysis interface; and a selection of a criteria with which to group the defects at an upper right portion of the defect analysis interface.

20. The system of claim 1, wherein the providing of the defect analysis interface comprises populating:

a list of products associated with the defects in a bottom left portion of the defect analysis interface;

data associated with a type, location, or a root cause of the defects and a technique to resolve the defects at a bottom right portion of the defect analysis interface; and a selection of parameters indicative of constraints regarding the resolution of the defects at an upper portion of the defect analysis interface.

\* \* \* \* \*